June 25, 1957     O. W. LORR     2,797,106
DIRIGIBLE WHEEL SUPPORT FOR TRACTOR HAULED TRAILERS
Filed Feb. 8, 1954     3 Sheets-Sheet 1
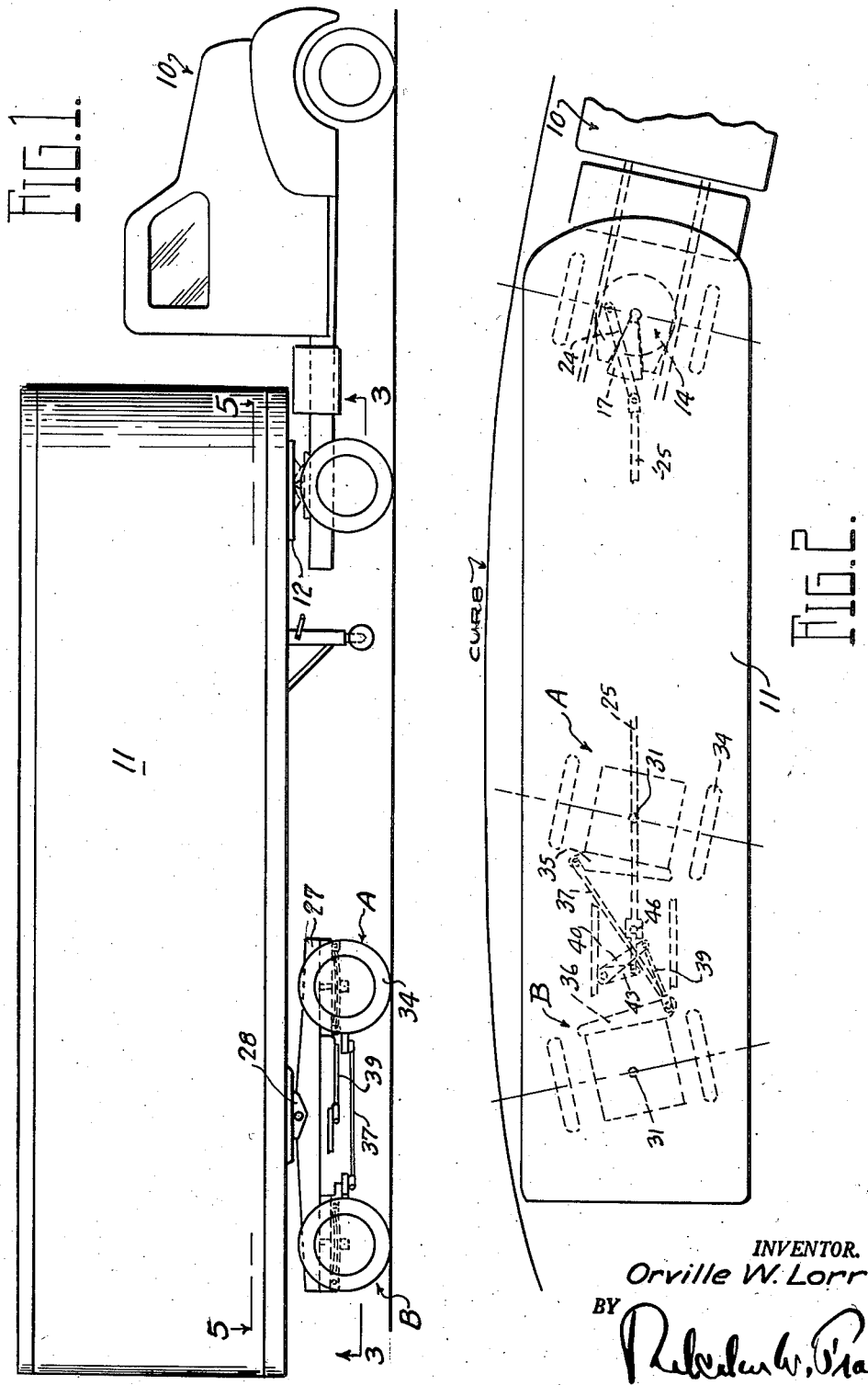
INVENTOR.
Orville W. Lorr
BY
ATTORNEY

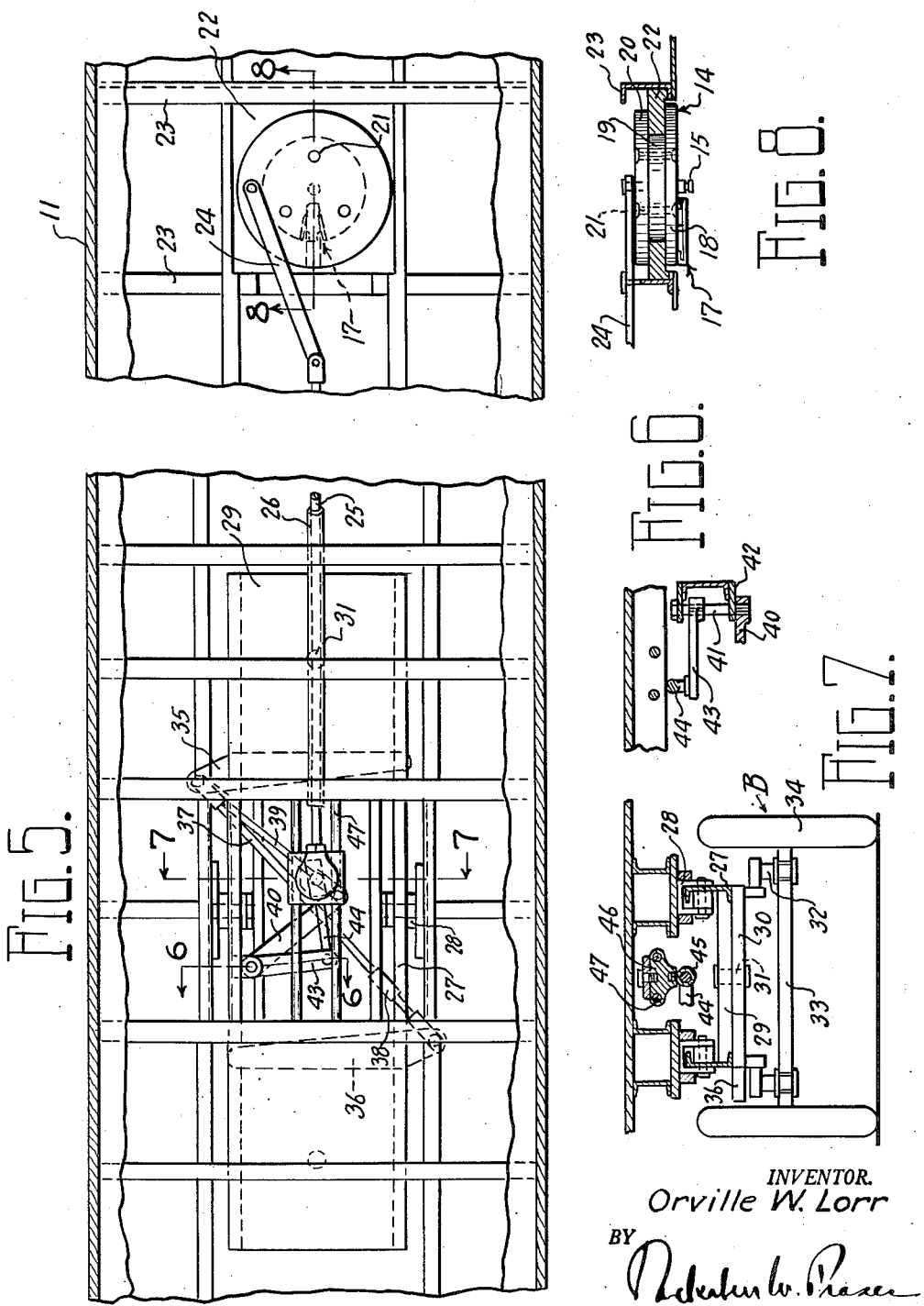

June 25, 1957  O. W. LORR  2,797,106
DIRIGIBLE WHEEL SUPPORT FOR TRACTOR HAULED TRAILERS
Filed Feb. 8, 1954  3 Sheets-Sheet 3
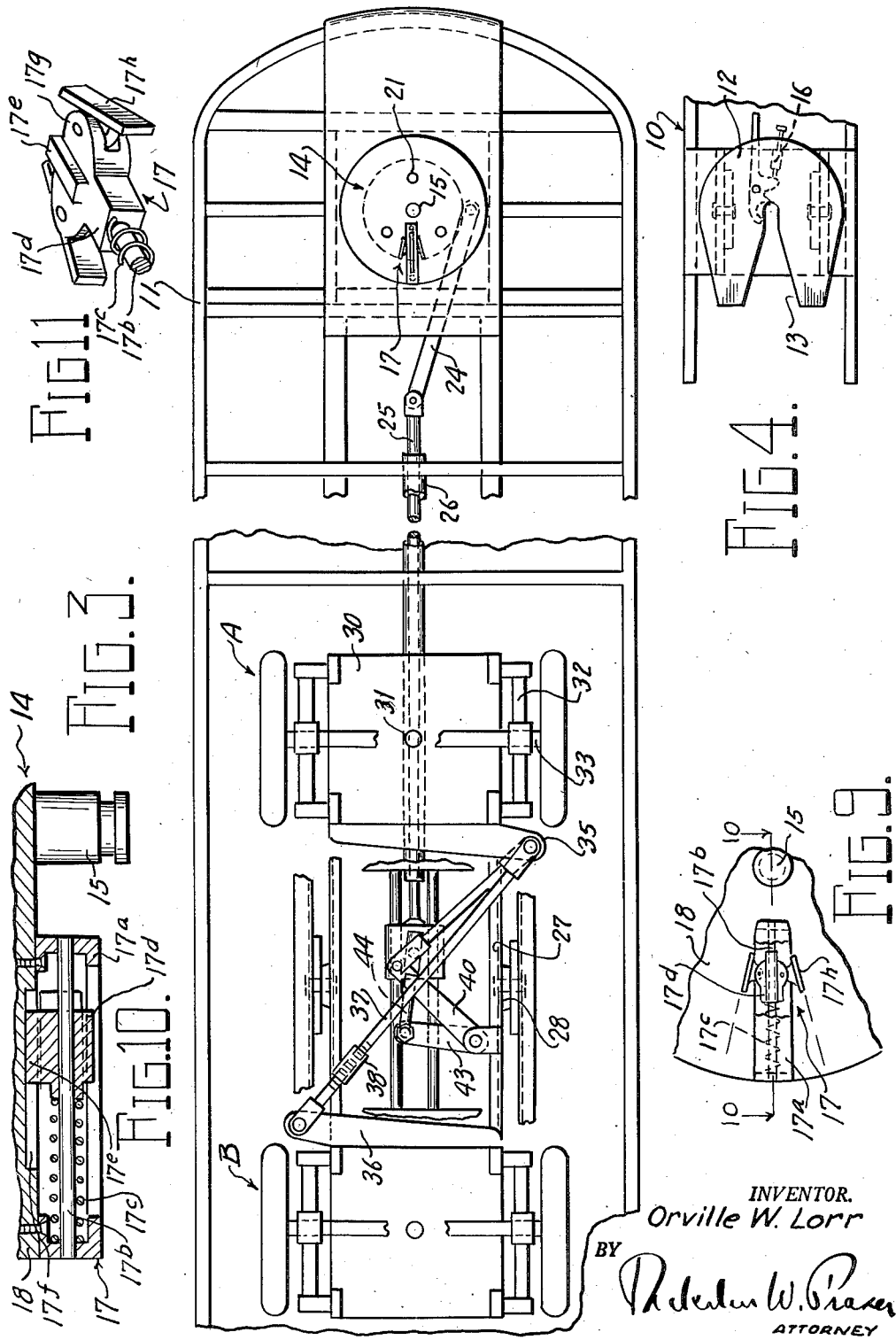
INVENTOR.
Orville W. Lorr
BY
ATTORNEY United States Patent Office 2,797,106
Patented June 25, 1957

2,797,106

DIRIGIBLE WHEEL SUPPORT FOR TRACTOR HAULED TRAILERS

Orville W. Lorr, Holland, Ohio

Application February 8, 1954, Serial No. 408,839

8 Claims. (Cl. 280—426)

This invention relates to tractor-hauled trailers but more particularly to devices for enhancing the maneuverability of trailers for facilitating turning, backing and other maneuvers normal to the operation of trailers when coupled to power-driven tractors.

An object is to produce new and improved mechanism for the conjoint actuation of the sets of trailer-supporting wheels in such manner as to be responsive to the turning movements of the hauling tractor.

Another object is to provide a tractor-trailer assembly with mechanism whereby the trailer-supporting wheels are positively turned or inclined in one direction or the other in accordance with predetermined turning or movement of the tractor in any direction deviating from a straight line movement.

A further object is to produce a steering means for a tractor-hauled trailer which has several independently mounted sets of wheels arranged one set in front of the other, and tractor controlled means for automatically and concomitantly rocking such sets of wheels in opposite directions in response to and dependent upon the turning movement of the tractor.

A still further object is to equip both the trailer and the hauling tractor with means whereby the independent sets of trailer-supporting wheels are automatically inclined in opposite directions in response to changes in the direction of tractor movement.

Other objects reside in details of construction and arrangement of parts, and for purposes of illustration but not of limitation, an embodiment of the invention is shown on the accompanying drawings in which Figure 1 is a side elevation of a tractor-trailer assembly embodying the invention;

Figure 2 is a diagrammatic top plan view of the tractor-trailer assembly showing the effect on the trailer-supporting wheels when the hauling tractor turns;

Figure 3 is a bottom plan view on an enlarged scale of the trailer taken substantially on the line 3—3 of Figure 1;

Figure 4 is a top plan view of a fragment of a hauling tractor showing the ramp plate and associated structure;

Figure 5 is an enlarged sectional view substantially on the line 5—5 of Figure 1;

Figure 6 is a fragmentary sectional view substantially on the line 6—6 of Figure 5;

Figure 7 is a transverse fragmentary sectional view substantially on the line 7—7 of Figure 5;

Figure 8 is a sectional view substantially on the line 8—8 of Figure 5;

Figure 9 is a fragmentary bottom plan view of the oscillatable slide plate member for the fifth wheel;

Figure 10 is an enlarged sectional view on the line 10—10 of Figure 9; and

Figure 11 is a perspective view of the wedge shoe assembly which forms a part of the fifth wheel slide plate.

The illustrated embodiment of the invention comprises a tractor and trailer assembly, the tractor being indicated at 10 and the trailer at 11, the two being coupled together so that the tractor can haul the trailer. The tractor 10 is of any well known type and as shown has front steering wheels and rear traction wheels, a suitable power plant such as a gasoline or diesel engine being disposed beneath the hood so as to afford adequate power to the tractor for hauling the trailer 11. At the rear end portion of the tractor and supported by the rear traction wheels is a platform on which is disposed a ramp plate 12 (Figure 4) which is provided with a V-shaped notch at the rear end. The ramp plate is pivotally mounted on suitable brackets as indicated in Figure 1 so that it can rock sufficiently to receive the slide plate on the trailer in order to couple the trailer and tractor together.

The front end of the trailer 11 is formed with a wheel unit 14 as indicated on Figure 8 for coupling to the ramp plate 12. Depending centrally from the wheel unit 14 is a king pin 15 which is adapted to be forced into the V-shaped notch 13 of the ramp plate and when in its innermost position to be secured in place by suitable latch mechanism 16 thereby to retain the king pin in the desired position relative to the ramp plate. Formed on the wheel 14 and rigid therewith is a wedge member 17, the small end portion of which is disposed adjacent the king pin 15 and the larger end portion projecting outwardly beyond the periphery of the wheel 14. The wedge member 17 is adapted to fit into the pie-shaped notch 13 in the ramp plate 12 for a purpose hereinafter to be described.

The wheel unit 14 comprises a lower circular disk-like plate 18 from which the king pin 15 depends centrally. At the upper side of the slide plate 18 is a circular intermediate or hub portion 19 of less diameter than that of the plate 18 and disposed on the opposite side of the hub member 19 is an upper disk-like plate 20. The plates 18 and 20 and the intermediate hub member 19 are rigidly connected together by a plurality of rivets 21. The wheel above described is rotatively mounted within a block 22 which is rigidly secured between a pair of transverse beams 23 which extend from side to side of the trailer. The block 22 has a central aperture which is shaped to conform to the hub portion 19. It will also be noted that the thickness of the block 22 is slightly less than the space between the plates 18 and 20. Thus it will be apparent that the wheel member 14 can turn freely wtihin the block 22.

It is recognized that the different manufacturers construct their ramp plates 12 somewhat differently from each other. For example, the size and angularly of the pie-shaped notch 13 varies substantially as does also the end portion which is in the form of a narrow neck wherein the king pin 15 eventually is secured by the latch mechanism 16. Thus in order to accommodate the different ramp plate structures, the wedge member 17 is automatically adjustable to accommodate itself to the different ramp plates. As shown particularly in Figures 9 through 11, there is secured to the under face of the plate 18 of the wheel unit 14 a housing 17a which is disposed radially relative to the king pin 15. Disposed longitudinally of the housing 17a and also arranged radially with respect to the wheel is a guide rod 17b about which is disposed a helical coiled spring 17c, one end of which abuts against the housing wall and the opposite end bears against the adjacent end of a slide 17d which is reciprocable on the rod 17b. On the top surface of the slide is an elongate rib 17e which extends into an elongate groove 17f. Thus the sliding movement of the slide 17d is restricted and guided so as to cause it to shift in a radial direction, the structure being rugged and sturdy in order to resist effectively lateral strains or stresses which may be imposed in the operation of the vehicles. Integral with the slide 17d on opposite sides are furcated lateral extensions 17g and pivotally mounted therein to rock about vertical axes are wedge plates 17h. The plates 17h are adapted to engage the opposite inclined edges of the V-shaped notch 13 in the ramp plate 12 and by sliding along the rod and guided as above indicated the wedge unit 17 may retract or slide rearwardly until the desired contact is effected with the notch portion until of course the king pin 15 has been forced into its proper position. It will thus be apparent that by relatively simple structure the wheel unit 14 automatically adapts itself to the ramp plates of different manufacturers. In this manner one or another tractor can be brought into engagement with the trailer mechanism for hauling purposes, thereby obviating the necessity of providing a special damp plate for the structure inasmuch as the wheel 14 has an automatically adjustable wedge unit accommodating itself to the various ramp plate structures.

Pivotally connected to the upper plate 20 of the wheel 14 near the rim thereof is a link 24 which extends rearwardly and is pivotally connected to the front end of a longitudinally disposed rod 25. The rod 25 is disposed centrally of the trailer and arranged at the underside thereof and is slidable within a guide tube 26 which is fixed to the underside of the trailer and extends a substantial portion of the length thereof. The rear end portion of the trailer 11 is supported by rubber tired wheels and in this instance there are two sets of wheel units indicated at A and B. As shown each of the wheel units consists of a rubber tired wheel on each side of the trailer, the same being connected by an axle and the arrangement being that the wheel unit A can rock independently of the wheel unit B. As indicated in Figure 2 these two units are connected together so that when one unit is rocked in one direction the other unit is rocked in the opposite direction and such rocking movement is conjointly effected in response to the movement of the hauling trailer-tractor 10 which upon turning in one direction or the other causes the link 24 to be actuated either to shift the longitudinally alongate rod 25 forwardly or rearwardly. Such movement of the rod 25 effects the actuation of the wheel units A and B as will be hereinafter described.

Inasmuch as the wheel units A and B are similarly constructed, a description of one unit will suffice. As shown the two units A and B are carried by a common frame 27 which is rockably mounted on a horizontal axis intermediate its ends and between the wheel units by suitable brackets 28 fixed to the underside of the trailer.

Each wheel carrying unit has a bed plate 29 which is secured to the common frame 27 in any suitable manner and the bed plate 29 as shown is generally flat and extends transversely of the underside of the trailer and directly beneath the plate 29 is an oscillatable plate 30 which is centrally connected to the bed plate 29 by an axle or pivot member 31 enabling the plate 30 to oscillate in one direction or the other about a vertically disposed pivot. At opposite sides of the bed plate 30 and suitably supported thereby are leaf spring assemblies 32, the central portion of which in each case is connected to a suitable pad on a transverse axle 33. The rubber tired wheels 34 are mounted on opposite ends of the axle substantially as shown on Figure 7. Thus each of the wheel units A and B are provided with rubber tired wheels which are spring mounted and which are capable of turning movement relative to or along with the oscillatable plate 30 so as to dispose the wheels in different angular positions according to the turning movement of the hauling tractor 10.

A rigid arm is associated with each of the wheel units A and B. As shown an arm 35 is rigid with the oscillatable plate 30 for the unit A and is disposed on the inner side of such plate. A portion of the arm 35 extends outwardly beyond the adjacent side of the respective plate 30. For the unit B an arm 36 is rigid with the inner side of the oscillatable plate 30 for the unit B and a portion of the arm 36 projects laterally beyond the respective plate 30 as indicated, for example, on Figure 3. Thus the arms 35 and 36 are rigid with each of the respective wheel units for rocking movement therewith. The projecting ends of the arms 35 and 36 are connected by a pivotally mounted link 37 which has a turn buckle 38 enabling length adjustment thereof. Extending from the projecting portion of the rigid arm 35 of the forward wheel unit A is a shorter link arm 39, one end of which is connected to the arm 35 at the same pivotal point as the link 37. The inner end of the arm 39 is pivotally connected to an operating arm 40 which as shown particularly on Figure 6 is fixed to the lower end of a vertically disposed stub shaft 41 which has a bearing in a bracket 42 suitably connected to a longitudinal beam of the trailer chassis. Also fixed to the vertical shaft 41 and spaced above the operating arm 40 is a second operating arm 43 which is somewhat shorter than the arm 40 and forms with the arm 40 an acute angle.

The free end of the operating arm 43 is connected by a pivotally mounted link 44 which extends to a universal joint in the form of a ball and socket 45 (Figure 7). The ball and socket joint 45 is suitably carried by the underside of a carriage 46 which is mounted for longitudinal shifting movement relative to the trailer 11. As shown a pair of laterally spaced parallel guide rods 47 are fixed to the under portion of the trailer and the carriage 46 has bearings which slide over the guide rods 47. The rear end of the operating rod 25 is suitably fixed to the carriage 46 so that longitudinal movement of the rod 25 is imparted to the carriage 46 which through the connections above described, effects the movement of the wheel units A and B in opposite directions. Thus when the wheel unit A rocks to the right, the wheel unit B concomitantly is rocked to the left. This is clearly indicated on Figure 2.

From the above description it will be manifest that I have produced an exceedingly simple and reliable mechanism for actuating a wheel unit which supports a trailer. These wheel units are rocked in opposite direction in response to turning movement of the hauling tractor 10. When the hauling tractor 10 moves laterally in one direction or the other, such movement is imparted through the ramp plate 12 and the wedge member 17 to the wheel 14 which then transmits such movement through the link 24 to the link 25 which extends longitudinally of the trailer. The movement forwardly or rearwardly of the rod 25 is imparted through the operating arms and links above described so as conjointly to rock the wheel unit in one direction or the other. However, the wheel units are always rocked in opposite directions thereby to facilitate the maneuverability of the trailer and enable it more readily to negotiate curves and assisting substantially in the hauling of the trailer as well as the backing of it and parking which are at best troublesome problems.

Numerous changes may be effected in the structure, arrangement and assembly of parts without departing from the spirit of the invention especially as defined in the appended claims.

What I claim is:

1. In a device of the class described, a trailer, a tractor for hauling the trailer, detachable ramp plate means for coupling the trailer and tractor and including a member on said trailer oscillatable in response to turning movement of the tractor, a ramp plate mounted on said tractor having a rearwardly opening V-shaped notch therein leading to a king pin slot, said oscillatable member being mounted adjacent the forward end of said trailer and having a king pin central thereon adapted to move into said king pin slot upon coupling of said tractor and trailer, and a slidingly adjustable wedge member disposed radially of said member and rearward of said king pin, said wedge member being adjustably engaged in said V-shaped notch of said ramp member upon coupling of said tractor and trailer, said wedge member having sliding means thereon adjustably disposed in said V-shaped notch and firmly engaged therein upon coupling of said tractor and trailer, trailer supporting wheels, said wheels being arranged in units, each unit having a wheel on each side portion of the trailer, each unit being mounted for rocking movement about a vertical axis, a longitudinally shiftable rod, a guide for said rod, a link pivotally connecting said oscillatable member and the front end of said shiftable rod, thereby to impart movement in one direction or the other to said rod dependent upon whether said member oscillates in one direction or the other, and means providing an operative connection between the rear end of said rod and said units respectively to cause one unit to rock in one direction and the adjacent unit to rock in the opposite direction.

2. The organization as claimed in claim 1, in which two wheel units are arranged in longitudinally spaced relation, a support common to said wheel units, and a pivotal mounting for said common support enabling same to rock about a horizontally disposed axis.

3. The organization as claimed in claim 1, comprising a diagonal link connection on opposite end portions of adjacent wheel units, whereby rocking of one unit in one direction causes rocking of the other unit in the opposite direction.

4. In a tractor hauled semi-trailer, a supporting wheel unit, a mounting for said unit enabling oscillation about a vertical axis, a fifth wheel member at the forward end of the semi-trailer said wheel member being horizontally mounted on said semi-trailer and including an oscillatable element having a centrally disposed depending king pin, an automatically adjustable radially disposed wedge member carried on the underside of said wheel member rearwardly of said king pin, said wedge member comprising a housing, a spring tensioned radially shiftable slide, guide means for said slide mounted in said housing, wedge plate elements disposed at opposite sides of said slide and pivoting freely horizontally on vertical pins anchoring said plate elements in said slide, said slide being urged in said housing in the direction of said king pin by said spring, a ramp plate on said hauling tractor having a rearwardly opening V-shaped notch with straight side edges leading to a king pin slot substantially central of said ramp plate, said wedge member being engageable in said ramp plate notch against the sides thereof upon engagement of said wheel member king pin in said ramp plate slot and being freely disengageable therefrom upon release of said king pin from said ramp plate slot, an elongate shaft extending rearwardly from the region of said fifth wheel member and terminating in the region of said wheel unit, guide bearings for said shaft enabling to and fro sliding movement, a mechanical connection between the front end of said shaft and said fifth wheel member to cause reciprocatory movement of the former from oscillatory movement of the latter, a slide reciprocable with said shaft and joined to the rear end thereof, guide bearings for said slide for enabling reciprocation thereof, and a series of links and levers providing an articulated connection between said slide and a side portion of the wheel unit to cause rocking of the wheel unit from reciprocation of the slide in one direction or the other according to the direction of movement of the slide.

5. The organization as claimed in claim 4, in which the mechanical connection between the shaft and fifth wheel member comprises a link pivoted at one end to the end of the shaft and at the other end to an edge portion of the fifth wheel member thereby to impart a push or a pull to the shaft dependent upon the movement of such member.

6. In a semi-trailer, a supporting wheel assembly comprising a frame, a mounting for said frame enabling rocking thereof about a horizontal axis transverse of the vehicle, a pair of longitudinally spaced wheel units, each unit comprising wheels at opposite sides of the vehicle, a mounting therefor, and a central pivotal connection with said frame enabling rocking movements about a vertical axis, a fifth wheel member at the forward end of the semi-trailer, a mounting for said fifth wheel member enabling oscillating movements, an automatically adjustable element on said fifth wheel member for connection to a ramp member of a hauling tractor, said adjustable element comprising a radially disposed wedge member carried on the underside of said fifth wheel member, said wedge member comprising a housing mounted on said fifth wheel member, a spring tensioned radially shiftable slide, guide means for said slide affixed in said housing, wedge plate elements disposed at opposite sides of said slide and pivoting freely horizontally on vertical pins anchoring said plate elements in said slide, said ramp member having a rearwardly opening V-shaped notch with straight sides leading to a king pin slot substantially central of said ramp member, said wedge plate elements being adjustably positioned along the straight sides of said notch to the extent permitted by the angularity of said notch upon connection of said fifth wheel member with said ramp member, an elongate shaft extending rearwardly from the region of said fifth wheel member and terminating in the region of said wheel units, guide bearings for said shaft enabling to and fro sliding movement of said shaft, a mechanical connection between the front end of said shaft and said fifth wheel member to cause reciprocatory movement of the former from oscillatory movement of the latter, a slide reciprocable with said shaft and joined to the rear end thereof, guide bearings for said slide for enabling reciprocation thereof, and a series of links and levers providing an articulated connection between said slide and opposite side portions of said wheel units respectively to cause simultaneous rocking of said wheel units in opposite directions.

7. In a semi-trailer, a supporting wheel assembly comprising a frame, a mounting for said frame enabling rocking thereof about a horizontal axis transverse of the vehicle, a pair of longitudinally spaced wheel units, each unit comprising wheels at opposite sides of the vehicle, a mounting therefor, and a central pivotal connection with said frame enabling rocking movements about a vertical axis, a fifth wheel member at the forward end of the semi-trailer, a mounting for said fifth wheel member enabling oscillating movements, an automatically adjustable element on said fifth wheel member for connection to a ramp member of a hauling tractor, said adjustable element comprising a radially disposed wedge member carried on the underside of said fifth wheel member, said wedge member comprising a housing mounted on said fifth wheel member, a spring tensioned radially shiftable slide, guide means for said slide affixed in said housing, wedge plate elements disposed at opposite sides of said slide and pivoting freely horizontally on vertical pins anchoring said plate elements in said slide, said ramp member having a rearwardly opening V-shaped notch with straight sides leading to a king pin slot substantially central of said ramp member, said wedge plate elements being adjustably positioned along the straight sides of said notch to the extent permitted by the angularity of said notch upon connection of said fifth wheel member with said ramp member, an elongate shaft extending rearwardly from the region of said fifth wheel member and terminating in the region of said wheel units, guide bearings for said shaft enabling to and fro sliding movement of said shaft, a pivoted link connection between the front end of said shaft and said fifth wheel member to cause reciprocatory movement of the former from oscillatory movement of the latter, a slide reciprocable with said shaft and joined to the rear end thereof, guide bearings for said slide for enabling reciprocation thereof, and a series of links and levers providing an articulated connection between said slide and opposite side portions of said wheel units respectively to cause simultaneous rocking of said wheel units in opposite directions, said articulated connection including a universal joint at said slide.

8. In a trailer arranged to be hauled by a tractor having a ramp plate, said ramp plate having a rearwardly opening V-shaped notch with straight side edges leading to a king pin slot substantially central of said ramp plate, an oscillatable fifth wheel member carried by and adjacent the forward end of said trailer, a king pin central of and depending from said wheel member, an automatically adjustable ramp plate engaging wedge member mounted on the undersurface of said wheel member and disposed radially thereon and rearwardly of said king pin in its normal ramp plate engaging position, said wedge member comprising a housing, a spring tensioned radially shiftable slide in said housing, a pair of freely pivoting wedge plate elements horizontally disposed at opposite sides of said slide, radially disposed guide means for said slide in said housing, whereby said wedge plate elements adapt themselves along the sides of said ramp plate V-shaped notch, upon engagement of said wheel member with said ramp plate, and locate themselves in said notch for responsive conjoined movement with movement of said ramp plate.

References Cited in the file of this patent

UNITED STATES PATENTS

| | | |
|---|---|---|
| 1,480,279 | MacLachlan | Jan. 8, 1924 |
| 1,868,912 | Plank | July 26, 1932 |
| 2,233,116 | Voorheis | Feb. 25, 1941 |
| 2,325,609 | Johnson | Aug. 3, 1943 |
| 2,342,697 | Runyan | Feb. 29, 1944 |
| 2,433,268 | Fellabaum | Dec. 23, 1947 |

FOREIGN PATENTS

| | | |
|---|---|---|
| 608,521 | France | July 28, 1926 |